Dec. 16, 1958     C. W. BRUGER     2,864,110
SHAFT AND HOLDER FOR CLEANING IMPLEMENTS
Filed May 28, 1954
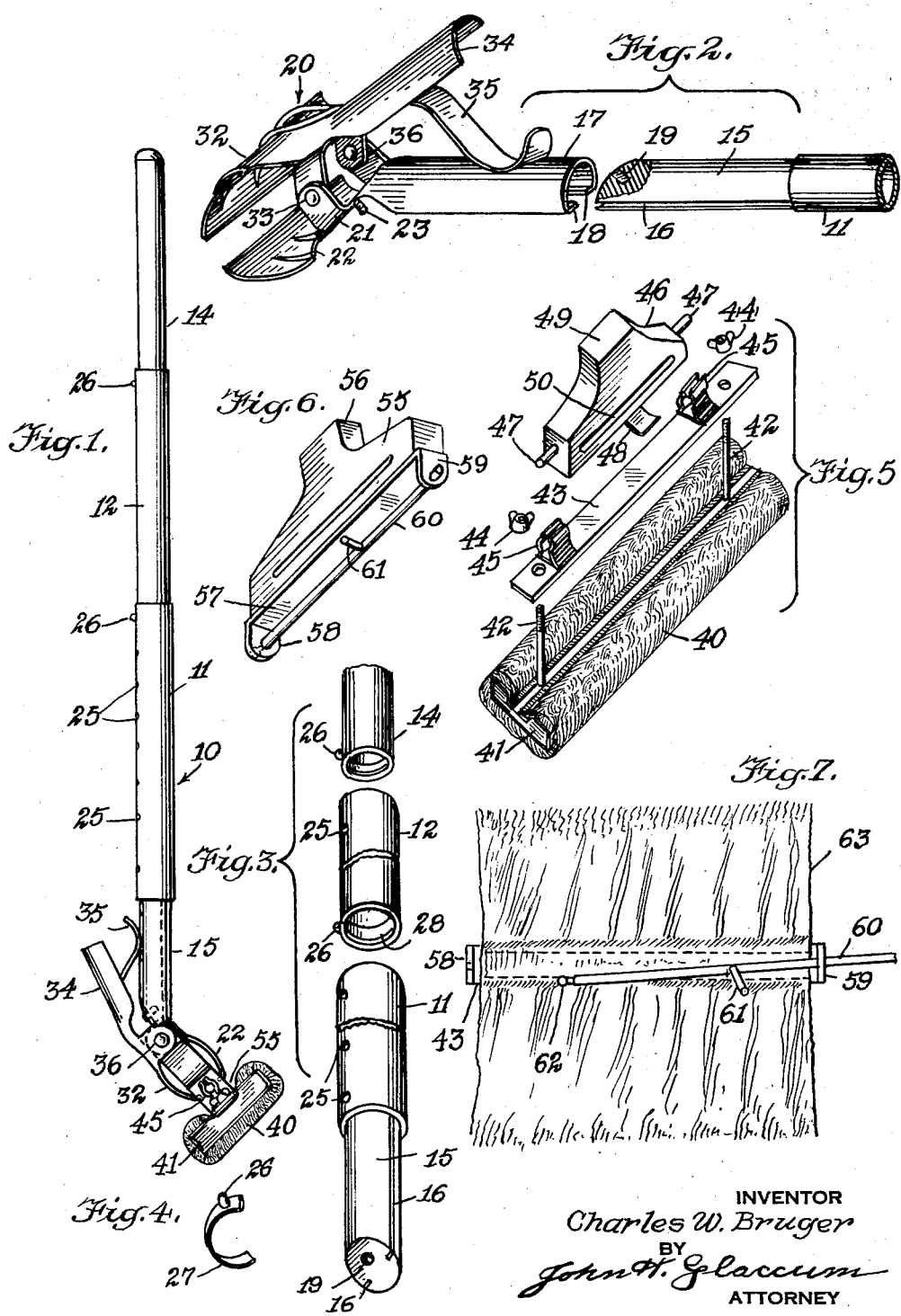
INVENTOR
Charles W. Bruger
BY
John H. Glaccum
ATTORNEY

# United States Patent Office 2,864,110
Patented Dec. 16, 1958

2,864,110

SHAFT AND HOLDER FOR CLEANING IMPLEMENTS

Charles W. Bruger, Union City, N. J.; Walter S. Usher, executor of the estate of said Charles W. Bruger, deceased, assignor to Louise Taffe, Palisades Park, N. J.

Application May 28, 1954, Serial No. 432,987

1 Claim. (Cl. 15—144)

This invention relates to holders for cleaning implements, such as, mops, brushes, squeegees and the like and particularly to an improved shaft and means for attaching the shaft to the clamping head.

This invention is an improvement over my prior Patent No. 2,672,639 issued on March 23, 1954.

An object of the invention is to develop a telescopic handle which has a large number of adjustments so that it may be collapsed for storage but adjusted to any length required by the work to be done or the height of the operator. For instance, it may be adjusted for use on ceilings, on walls and may be readjusted for close work such as window cleaning.

Another object of the invention is to provide an adjustable handle which will not have any straps, screws or bolts and which will avoid discomfort in the hand of the operator when interchanging appliances.

A further object is to provide a shaft which positively but simply engages the clamping member and prevents relative rotation between them.

Other objects and advantages will become apparent from the following description and the accompanying drawings.

In the drawings:

Fig. 1 is a side elevation of a clamp for a duster member and handle member in accordance with my invention.

Fig. 2 is a partial sectional view showing the clamp and handle separated, the handle being broke away.

Fig. 3 is an exploded view in perspective showing the various elements making up the shaft handle.

Fig. 4 is a detailed view of the plunger and spring which makes the handle adjustable.

Fig. 5 is an exploded view of a wall duster for use with the holder.

Fig. 6 is a perspective view of a block or backing member adapted for use with the various elements such as a mop.

Fig. 7 is a plan view of a mop partially installed in the block or back shown in Fig. 6.

Referring more particularly to the drawings, I provide a telescopic shaft 10 which is preferably made of three telescoping members 11, 12 and 14, which has at its lower end a spline plug 15 and which has a pair of splines 16 formed therein. This plug 15 engages a semi-circular end 17 of the clamp member 20. The end 17 has inwardly extending flanges 18 which engage the splines 16 of the plug 15. The semi-circular end or extension 17 extends at an oblique angle to the jaw 22. The end 19 of the plug 15 is formed at an angle coinciding with the angle of the underside 21 of the jaw 22. A single screw 23 passing through the jaw 22 engages the end 19 of the plug 15 to hold the two in position.

The telescoping handle members 11 and 12 are provided with a series of openings 25 and the members 12 and 14 are each provided with a spring pressed plunger 26 to engage the openings 25. The spring pressed plunger as shown in Fig. 4 is mounted on a semi-circular spring 27 which is inserted in a groove 28 within the end of the members 12 and 14. In order to collapse the handle it is only necessary to press the plunger 26 to rotate the shaft members slightly so that they will not engage the holes 25 and push the handle members inwardly within the member 11. When it is desired to use the full length of the handle the members 14 and 12 are, of course, pulled out to their full length. When an intermediate length is required the plunger 26 is depressed and the handle shortened by moving the member 12 within 11 until the desired length is reached and the plunger is engaged in the selected hole.

The clamp member 20 comprises the jaw 22 and 32. The member 32 is pivoted at 33 to the member 22 and has an operating hand rest 34. The clamp members are urged together by a spring 35 which slides on the end 17.

A large number of cleaning implements may be used with my implement holder such as mops, brushes, waxers, dusters, window cleaners, squeegees and others. Each of these is provided with an attaching block, all of which have identical shaped ends or backs. In Fig. 5 is shown a wall duster which is demountable for cleaning or replacement. As is shown, the dusting material or brushing material 40 is wrapped around a block 41 having bolts 42. A plate 43 is clamped on the bolts against the material by means of wing nuts 44. The plate 43 is provided with spring snaps 45. The block or back 46 is provided with pins 47 to engage the snaps 45 at the lower portion of the block 46 for a finger or plate 48 to prevent excess pivoting between the back and the block 41.

It will be appreciated that a large number of implements may be constructed similar to the ones discussed and may be snapped on and off the block 46. The block 46 has an extension 49 and grooved cavities 50 on either side of the block. When the implement is placed within the holder the jaws 22 and 32 engage the groove 50 and the extension 49 extends upwardly between the members 36 hinging the two clamps together. With this construction it is not necessary to have a strong spring pressure to urge the clamps together since the action of the extension clearly and effectively limits the movement.

It will be appreciated that the cleansing element in the unit just described may be easily removed for washing or replacement without completely disassembling the implement.

In the modification shown in Fig. 6 the block or back 55 has the identical extension 56 and is provided with a flat piece of metal 57 having depending ears 58 and 59. A rod 60 having a small operating handle 61 and being notched at one end 62 is provided to hold a mop 63.

It will be understood that the mop is opened up and placed against the plate 57 and the rod 60 passed through the ears 58 and 59 to hold the mop in place.

It will be understood that with my holder any given number of implements may be used with the single handle. When the handle is collapsed it may be stored in a very small place. It desired, the holder with all four implements may be kept in a single box.

I claim:

A handle for an implement holder which consists of a clamp to receive an implement, an arcuate extension on said clamp member extending at an oblique angle thereto and having inwardly extending flanges, said handle having a plug at its lower end, a pair of splines in said plug engaging the flanges of said arcuate extension, said plug having an end having the same angle as the angle between the inner end of the arcuate extension and the clamp member, a screw through said clamp member engaging the end of said plug, said handle member comprising upper and lower telescoping sections, the upper section of said handle having an inner arcuate groove at one end thereof, a semi-circular spring in said groove and a plunger on said spring, the lower section of said handle having a plurality of apertures to selectively engage said plunger.

References Cited in the file of this patent

UNITED STATES PATENTS

| Re. 7,567 | DeForest | Mar. 27, 1877 |
| 1,365,851 | Reynolds | Jan. 18, 1921 |
| 1,609,906 | Buckley | Dec. 7, 1926 |
| 1,734,503 | Smith | Nov. 5, 1929 |
| 1,967,406 | Hicks | July 24, 1934 |
| 2,014,490 | Brandel | Sept. 17, 1935 |
| 2,328,287 | Martin | Aug. 31, 1943 |
| 2,606,050 | Morris et al. | Aug. 5, 1952 |
| 2,672,639 | Bruger | Mar. 23, 1954 |

FOREIGN PATENTS

| 11,691 | Great Britain | May 18, 1909 |
| 220,780 | Great Britain | Aug. 28, 1924 |
| 744,194 | France | Jan. 21, 1933 |
| 798,851 | France | Mar. 11, 1936 |